(No Model.)
M. A. LUTHER.
INTRENCHING TOOL.
No. 484,806. Patented Oct. 25, 1892.
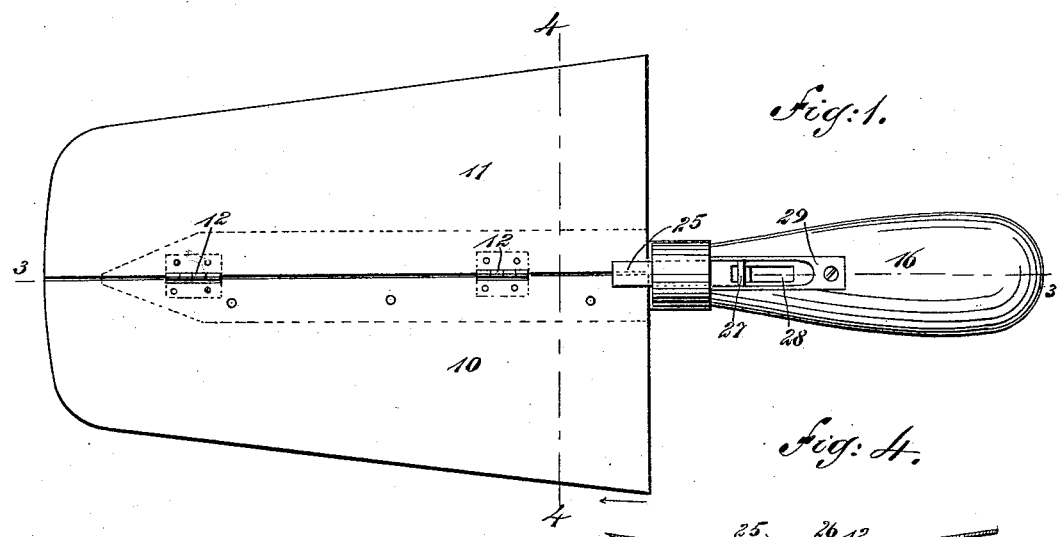
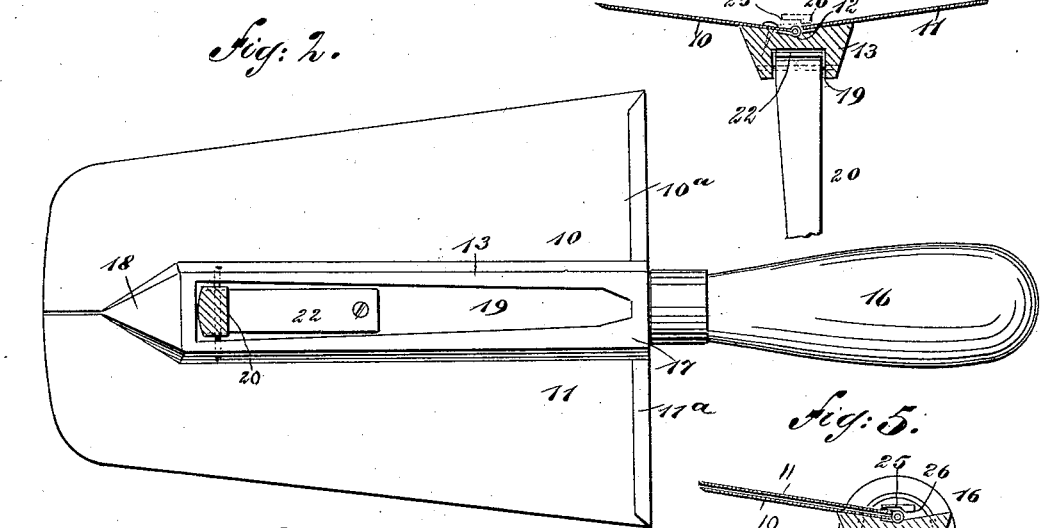
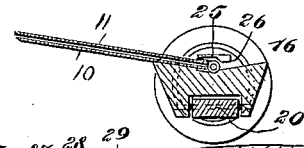
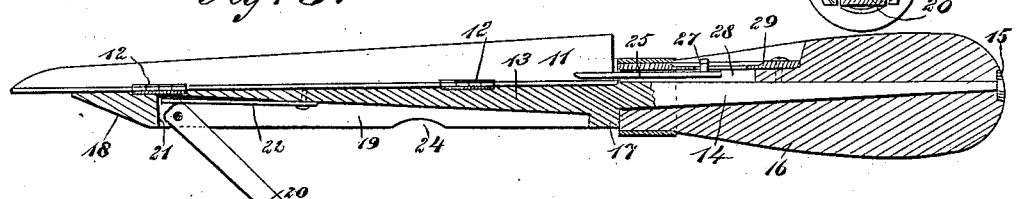
WITNESSES:
Chas. Nida.
C. Sedgwick
INVENTOR:
M. A. Luther
BY Munn & Co.
ATTORNEYS

UNITED STATES PATENT OFFICE.

MARTIN A. LUTHER, OF THE UNITED STATES ARMY.

INTRENCHING-TOOL.

SPECIFICATION forming part of Letters Patent No. 484,806, dated October 25, 1892.

Application filed January 12, 1892. Serial No. 417,818. (No model.)

*To all whom it may concern:*

Be it known that I, MARTIN A. LUTHER, of the United States Army, have invented a new and Improved Intrenching-Tool, of which the following is a full, clear, and exact description.

My invention relates to improvements in intrenching-tools; and the object of my invention is to produce a simple, strong, and convenient tool, which may be easily carried about by a soldier, which may be conveniently held in a small scabbard, and by means of which earthworks or intrenchments may be rapidly thrown up.

To this end my invention consists in an entrenching-tool the construction of which will be hereinafter described and claimed.

Reference is to be had to the accompanying drawings, forming a part of this specification, in which similar figures of reference indicate corresponding parts in all the views.

Figure 1 is a plan view of the tool embodying my invention, showing it in open position. Fig. 2 is an inverted plan of the same, partly in section. Fig. 3 is a longitudinal section on the line 3 3 in Fig. 1, showing the pick partially open. Fig. 4 is a cross-section on the line 4 4 in Fig. 1, and Fig. 5 is a cross-section of the implement with the blades folded together.

The tool is provided with a blade which tapers slightly toward the point and is shaped like an ordinary spade-blade, and the blade is made up of two similar parts 10 and 11, which are hinged together in the middle, as shown at 12, and which are preferably reinforced at their top edges, as shown at 10ª 11ª in Fig. 2. One member 10 of the blade is firmly secured to a longitudinal rib 13, which extends centrally along the back of the blade, and this rib is adapted to overlap the removable member 11 of the blade, so as to form a secure support for the same. The rib 13 has a shank 14, which extends through the handle 16 of the tool, and a nut 15 is secured to the rear end of the shank, so as to hold the handle in place. At the junction of the rib and handle the rib is provided with a shoulder 17, against which the handle abuts, and to strengthen the handle a ferrule of the ordinary kind is clasped around it. The front or lower end of the rib 13 is pointed, as shown at 18, so that it may easily enter the ground, and extending longitudinally of the rib is a groove 19, in which is pivoted a pick 20, which pick has a sharpened point, so that it may be used for loosening hard ground.

One end of the groove 19 terminates in a shoulder 21, against which the pick 20 may be swung, and secured in the bottom of the groove 19 is a strong spring 22, which is adapted to press upon the pivoted end of the pick, and when the pick is open the spring will hold it in open position. The pick is provided with notches 23 on the sides, which come opposite recesses 24 in the rib, and the notches enable the pick to be easily grasped by the thumb and finger, so as to be opened.

A bolt 25 is held to slide in a recess of the handle near its junction with the blade, the bolt being adapted to overlap the members of the blade, and the bolt is provided on one side and near one edge with a depending rib 26, which is adapted to press upon the member 11 of the blade when the blade is open, and thus prevent the member from being closed, and when the members of the blade are folded together the opposite side of the bolt will press upon them and hold them together, as shown in Fig. 5. The bolt is provided near its rear end with a button or stop 27, which projects outward through a slot 28 in the handle and through a slotted wear-plate 29, so that it may be conveniently operated by the thumb and the bolt pushed out or in, as desired. One edge of the fixed member 10 of the blade is sharpened, as best shown in Fig. 4, so that the tool may be used for cutting brush or fuel when necessary.

The tool is used as follows: If it is to be worked in loose ground, the blade is opened and held open by the bolt 25 in the manner described, and it may then be used as a shovel. If the tool is to be used in hard ground, the pick 20 is opened and the ground may be first loosened by the pick and then shoveled with ease. When not in use, the members of the blade are folded together, as described, and the tool may be carried in a comparatively-small scabbard.

Having thus fully described my invention, I claim as new and desire to secure by Letters Patent—

1. An intrenching-tool comprising a folding blade having a suitable handle and a fastening device to secure the blade in an open or folded position, substantially as described.

2. An intrenching-tool comprising a longitudinally-divided folding blade, a strengthening-rib secured to the back of the blade and provided with a handle, a pick secured to the rib, and a fastening device to hold the blade-sections in an open or folded position, substantially as described.

3. In an intrenching-tool comprising a rib having a suitable handle, a folding blade having one member fixed to the rib and the other member hinged to the fixed member, and a fastening device to hold the blade in open or folded position, substantially as described.

4. An intrenching-tool comprising a folding blade, a grooved rib secured to the back of the blade and provided with a handle, a swinging pick pivoted in the groove of the rib, and a fastening device to hold the blade in an open or folded position, substantially as described.

5. In an intrenching-tool, the combination, with the folding blade and the handle of the blade, of a sliding bolt mounted in the handle and adapted to overlap the blade, substantially as described.

6. The combination, with the folding blade and the handle thereof, of a sliding bolt mounted in the handle and adapted to overlap the blade, said bolt having a rib on the under side, substantially as described.

MARTIN A. LUTHER.

Witnesses:
JOSEPH SPRANGER,
WILLIAM FREER.